US009380087B2

(12) United States Patent
Carduner et al.

(10) Patent No.: US 9,380,087 B2
(45) Date of Patent: *Jun. 28, 2016

(54) TAGGING USERS OF A SOCIAL NETWORKING SYSTEM IN CONTENT OUTSIDE OF SOCIAL NETWORKING SYSTEM DOMAIN

(71) Applicant: Facebook, Inc., Menlo Park, CA (US)

(72) Inventors: Paul François Carduner, San Francisco, CA (US); Samuel Raymond Odio, Portola Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,818

(22) Filed: Apr. 28, 2015

(65) Prior Publication Data

US 2015/0237088 A1  Aug. 20, 2015

Related U.S. Application Data

(63) Continuation of application No. 13/197,996, filed on Aug. 4, 2011, now Pat. No. 9,037,658.

(51) Int. Cl.
| | |
|---|---|
| G06F 15/16 | (2006.01) |
| H04L 29/06 | (2006.01) |
| H04L 29/08 | (2006.01) |
| H04L 12/58 | (2006.01) |
| G06Q 30/02 | (2012.01) |
| G06Q 50/00 | (2012.01) |
| G06Q 10/10 | (2012.01) |

(52) U.S. Cl.
CPC .............. *H04L 65/403* (2013.01); *G06Q 10/10* (2013.01); *G06Q 30/02* (2013.01); *G06Q 50/01* (2013.01); *H04L 51/32* (2013.01); *H04L 67/02* (2013.01); *H04L 67/10* (2013.01)

(58) Field of Classification Search
CPC ....... G06Q 50/01; G06Q 30/02; G06Q 10/10; H04L 51/32; H04L 12/588
USPC .................................. 709/204–207, 248, 249
See application file for complete search history.

(56) References Cited

U.S. PATENT DOCUMENTS

| | | | |
|---|---|---|---|
| 2008/0005086 A1 | 1/2008 | Moore | |
| 2008/0069480 A1* | 3/2008 | Aarabi ................ | G06F 17/3028 382/305 |
| 2008/0222199 A1* | 9/2008 | Tiu ...................... | G06F 17/3089 |

(Continued)

OTHER PUBLICATIONS

PCT International Search Report and Written Opinion, PCT Application No. PCT/US2012/046953, Sep. 24, 2012, eight pages.

*Primary Examiner* — Hieu Hoang
(74) *Attorney, Agent, or Firm* — Fenwick & West LLP

(57) ABSTRACT

Users of a social networking system can tag other users in content items that are provided outside of the social networking system, such as pictures that are viewable on a website that is external to the social networking system. To enable a user to tag another user in a content item, an external system provides a user interface that enables the user to tag another user, optionally define a portion of the content item in which the tagged user appears, and provide an identity of the tagged user. The external system communicates with the social networking system to provide the tagging information to the social networking system. The tagging information is received by the social networking system, which imports the content item and displays the content item with the tagging information to other users in the social networking system.

19 Claims, 3 Drawing Sheets

(56) References Cited

U.S. PATENT DOCUMENTS

| | | | | |
|---|---|---|---|---|
| 2008/0294607 | A1* | 11/2008 | Partovi | G06Q 30/00 |
| 2008/0313000 | A1* | 12/2008 | Degeratu | G06Q 10/06 |
| | | | | 705/319 |
| 2009/0043789 | A1* | 2/2009 | Gupta | G06F 17/30029 |
| 2009/0132349 | A1* | 5/2009 | Berkley | G06F 17/30896 |
| | | | | 715/202 |
| 2009/0132373 | A1* | 5/2009 | Redlich | G06Q 30/02 |
| | | | | 705/14.39 |
| 2009/0216806 | A1* | 8/2009 | Feuerstein | G06F 17/30994 |
| 2009/0292814 | A1* | 11/2009 | Ting | G06F 15/16 |
| | | | | 709/229 |
| 2009/0324137 | A1* | 12/2009 | Stallings | G06F 17/30265 |
| | | | | 382/306 |
| 2010/0057768 | A1* | 3/2010 | Chen | G06F 17/3087 |
| | | | | 707/E17.005 |
| 2010/0064007 | A1* | 3/2010 | Randall | H04L 67/18 |
| | | | | 709/204 |
| 2010/0114991 | A1* | 5/2010 | Chaudhary | G06F 17/3002 |
| | | | | 707/809 |
| 2010/0153521 | A1* | 6/2010 | Lor | G06F 15/16 |
| | | | | 709/219 |
| 2010/0211535 | A1* | 8/2010 | Rosenberger | G06F 17/30038 |
| | | | | 706/20 |
| 2010/0223664 | A1* | 9/2010 | Naranjo | G06F 3/048 |
| | | | | 726/10 |
| 2010/0242121 | A1* | 9/2010 | Johnson | G06F 21/31 |
| | | | | 726/28 |
| 2010/0262918 | A1* | 10/2010 | Angell | G06F 3/048 |
| | | | | 715/738 |
| 2010/0312596 | A1* | 12/2010 | Saffari | G06Q 30/0203 |
| | | | | 705/7.32 |
| 2011/0022450 | A1* | 1/2011 | Meredith | G06Q 10/10 |
| | | | | 705/14.4 |
| 2011/0028128 | A1* | 2/2011 | Cazanas | H04N 7/17327 |
| | | | | 455/414.1 |
| 2011/0106736 | A1* | 5/2011 | Aharonson | G06Q 10/109 |
| | | | | 706/12 |
| 2011/0137975 | A1* | 6/2011 | Das | G06F 21/6254 |
| | | | | 709/203 |
| 2011/0145321 | A1* | 6/2011 | Jiang | G06F 17/30902 |
| | | | | 709/203 |
| 2011/0145327 | A1* | 6/2011 | Stewart | G06F 17/3002 |
| | | | | 709/203 |
| 2011/0145571 | A1* | 6/2011 | Schmidt-Karaca | H04L 63/0428 |
| | | | | 713/160 |
| 2011/0153330 | A1 | 6/2011 | Yazdani et al. | |
| 2011/0154223 | A1* | 6/2011 | Whitnah | H04L 51/32 |
| | | | | 715/753 |
| 2011/0154445 | A1* | 6/2011 | Schmidt-Karaca | G06Q 10/10 |
| | | | | 726/4 |
| 2011/0258326 | A1* | 10/2011 | Hu | H04L 63/062 |
| | | | | 709/226 |
| 2011/0280549 | A1* | 11/2011 | Walker | H04N 21/00 |
| | | | | 386/240 |
| 2011/0289143 | A1* | 11/2011 | Polis | H04L 67/2833 |
| | | | | 709/203 |
| 2011/0302098 | A1* | 12/2011 | Yoshida | G06Q 50/01 |
| | | | | 705/319 |
| 2012/0054691 | A1* | 3/2012 | Nurmi | G06Q 10/10 |
| | | | | 715/854 |
| 2012/0089451 | A1* | 4/2012 | Agramonte | G06Q 10/10 |
| | | | | 705/14.23 |
| 2012/0159635 | A1* | 6/2012 | He | G06F 21/6245 |
| | | | | 726/26 |
| 2012/0290591 | A1* | 11/2012 | Flynn | G06F 17/30247 |
| | | | | 707/754 |

\* cited by examiner

TAGGING USERS OF A SOCIAL NETWORKING SYSTEM IN CONTENT OUTSIDE OF SOCIAL NETWORKING SYSTEM DOMAIN

CROSS REFERENCE TO RELATED APPLICATIONS

This application is a continuation of U.S. application Ser. No. 13/197,996, filed Aug. 4, 2011, which is incorporated by reference in its entirety.

BACKGROUND

This invention relates generally to digital content, and more particularly to tagging social networking system users and other objects in digital content published outside of a social networking system domain.

Social networking systems typically allow users to upload photos, videos, and other types of digital content onto the social networking system, which then displays the content to other users of the social networking system. Social networking systems also enable users to tag themselves and other users in the uploaded digital content to indicate the identity of the people who appear in that content. For example, a user may upload a photo in which the user's friend appears and then tag the photo to indicate that the user's friend appears in the photo. Thereafter, other users of the social networking system can view the tagged photo and see that the friend appears in the photo. The social networking system can also route content items based on who is tagged in the content. In the previous example, the social networking system may forward the tagged photo to the friends of the user who were tagged in the photo, regardless of who uploaded the photo.

Although this tagging feature can be very powerful, it does not extend to content that appears outside of the social networking system. For example, many web pages accessible over the Internet may contain content in which users of the social networking system appear, but there are no tools that enable tagging users in that content in a way that is useable by the social networking system. A user can generally view web content associated with a particular person by searching for the content, e.g., using a search engine. But to link that content to the user's profile in the social networking system, the viewing user would have to save the content, manually upload the content to the social networking system, and then provide the tagging information within the social networking system. This method of tagging one's friends in can be cumbersome and time consuming.

SUMMARY

Embodiments of the invention allow a user to tag one or more users of a social networking system in a content item that is hosted outside of the social networking system domain. For example, a user viewing a content item hosted by a third party can add a tag to the content item to indicate that a user of the social networking system appears in that content item. The tagged content item is then associated with the tagged user within the social networking system. This association enables various functionalities in the social networking system, such as providing notifications to the tagged user's friends to view the content item with the tagged user or associating the tagged content item with the tagged user's profile, just to name a few.

In one embodiment, a tagging user is presented with a web page hosted by a third party. The web page includes tagging interface that allows a user to tag one or more users of the social networking system in a content item that appears within the web page. For example, the tagging user may tag another user in an image displayed on the web page to indicate that the tagged user is in the image. The tagging interface may be implemented by the third party website, which then communicates information about the tag to the social networking system, or the tagging interface may be provided by a plug-in operated by the social networking system within the external web page. The tagging interface includes user interface elements that allow the tagging user to identify the tagged user. The identities of the tagging user and tagged user are sent to the social networking system, which associates the tagged content item with the tagged user. In one embodiment, the social networking system retrieves the content item from the third party website and saves the content item for presentation within the social networking system domain. In another embodiment, the social networking system obtains a link or a reference to the tagged content item.

The embodiments presented herein allow users to tag users of a social networking system in web content that is hosted outside the social networking system domain. This allows the social networking system to provide a comprehensive user experience in which social networking system users can view content associated with another user regardless of whether it hosted by the social networking system or by a third party. Additionally, the social networking system can provide richer web content about the tagged user in social feeds of the social networking system by including information displayed and published outside of the social networking system domain.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
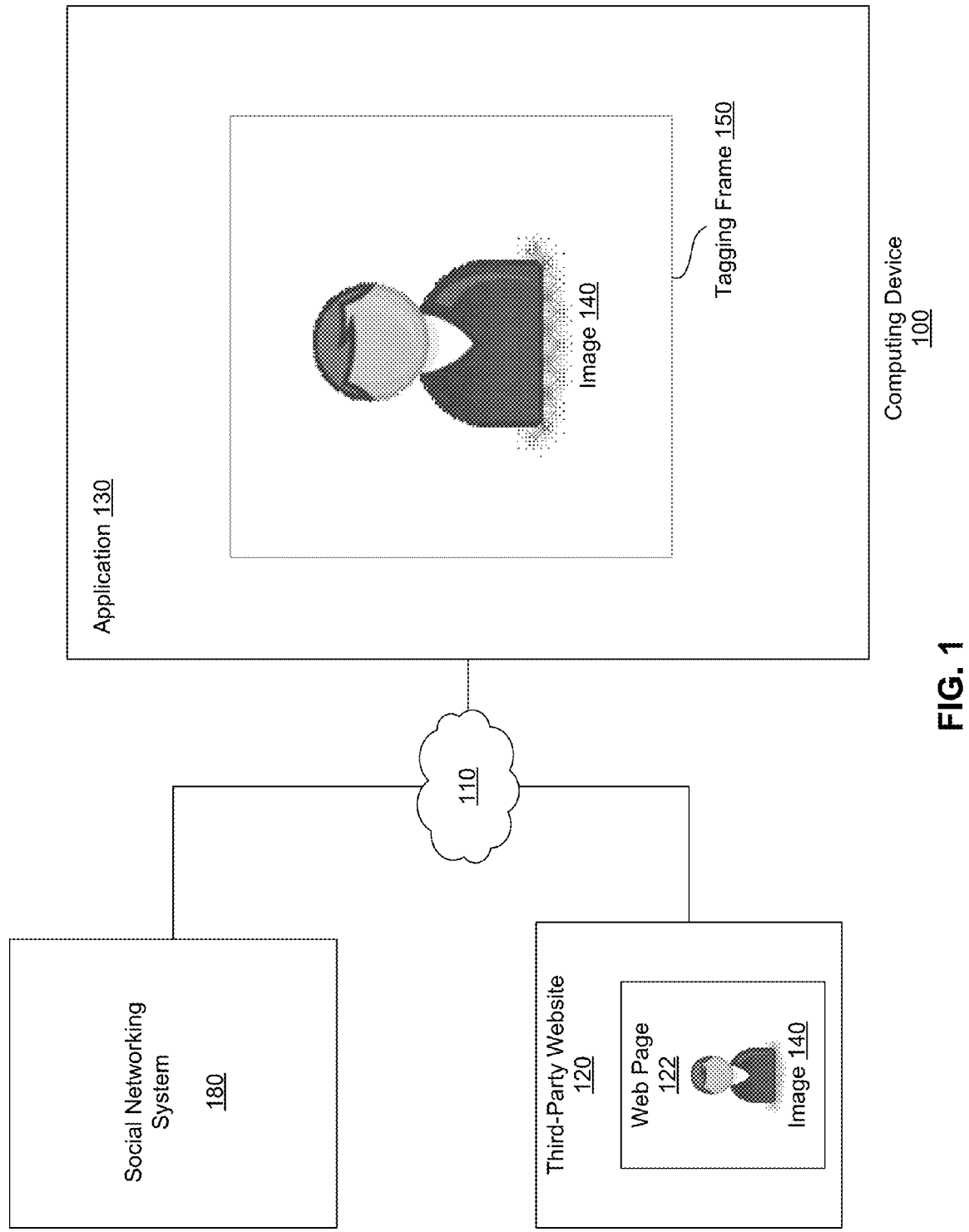
FIG. 1 illustrates an exemplary environment for tagging a user of a social networking system in digital media outside the social networking system, according to an embodiment of the invention.

The disclosed configuration allows users of a social networking system to tag users in digital content hosted by an entity outside the social networking system domain. FIG. 1 illustrates an exemplary environment for tagging digital media in accordance with an embodiment of the invention. The environment includes a third-party website 120, including a web page 122 and an image 140, an application 130 executing on a computing device 100, displaying the image 140 and a tagging frame 150 and a social networking system 180. The social networking system 180, the third-party website 120 and the computing device 100 are connected over a network 110.

The network 110 enables communications between the computing device 100, the social networking system 180 and one or more third-party websites 120. In one embodiment, the network 110 uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 110 can also include links to other networks such as the Internet.

In various embodiments, the computing device 100 retrieves web content via the network 110 and displays it to a user. The computing device 100 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the computing device 100 can be a device having computer functionality, such as a personal digital assistant (PDA), mobile telephone, video game system, etc. The computing device 100 has functionality to connect to the network 110 using one or more network protocols described in the specification above. For example, the computing device can include a modem, an Ethernet card, a wireless network card and the like to send and receive data from the network 110. The third-party website 120 comprises one or more web servers including one or more web pages 122, which are communicated to the computing device 100 using the network 110. The third-party website 120 is associated with a first domain while a social networking system website is associated with a separate social networking domain. A web page 122 included in the third-party website 120 comprises a markup language document identifying content and including instructions specifying formatting or presentation of the identified content. In one embodiment, a web page 122 includes an image 140. In other embodiments, other web content may be provided in a web page 122, including but not limited to videos, text, news stories and FLASH applications.

The social networking system 180 provides social networking services including but not limited to communication services, connection services, gaming services and so forth. Users can upload digital content on the social networking system 180 domain, wherein the digital content may include videos, images, etc. The social networking system may display the social content to user within the social networking system. For example, the social networking system may display the digital content to friends of the user or users within a same social network within the social networking system 180. In one embodiment, the social networking system may also provide functionality to allow users to tag users in the digital content such that others may be able identify the tagged user within the digital content.

The application 130 executes on a computing device to interface with a user by receiving user inputs and displaying digital content to the user. In one instance, the application 130 displays digital content retrieved from a third-party website 120 to a user. Application 130 may include web browsers, news applications, games, social networking system applications, video content viewing applications etc. Examples of applications 130 include but are not limited to INTERNET EXPLORER, GOOGLE CHROME, APPLE SAFARI and MOZILLA FIREFOX.

In one embodiment, a user views an image 140 rendered by the application 130 executing on a computing device 100 to tag social networking system users in the image 140. In one instance, a user requests the application 130 to retrieve a web page 122 from a third-party website 120. 100 responsive to a user request, the application 130 interfaces with the computing device 100 to retrieve the web page 122 from the third-party website 120 over the network 110. The application 130 renders the web page 122 including an image 140 displayed on the web page 122.

In one instance, the rendered image 140 includes social networking system information such that the user may tag social networking system users displayed in the image 140. In such an instance, the application 140 renders a tagging frame 150 around the image to indicate portions of the image to be tagged. The tagging frame 150 also includes user interface elements wherein a user can move the tagging frame 150 within a portion of the image 140. Additionally, the user may provide the identity of users in the image. In such an instance, the tagging information and the image 140 is provided to the social networking system over the network 110. The social networking system receives the tagged image 140 along with the tagging information and the tagged users' social networking system identity. The social networking system tags the tagged user in the image 140 within the social networking system, thereby providing content about a user otherwise stored outside of the social networking system.

Figure 2:
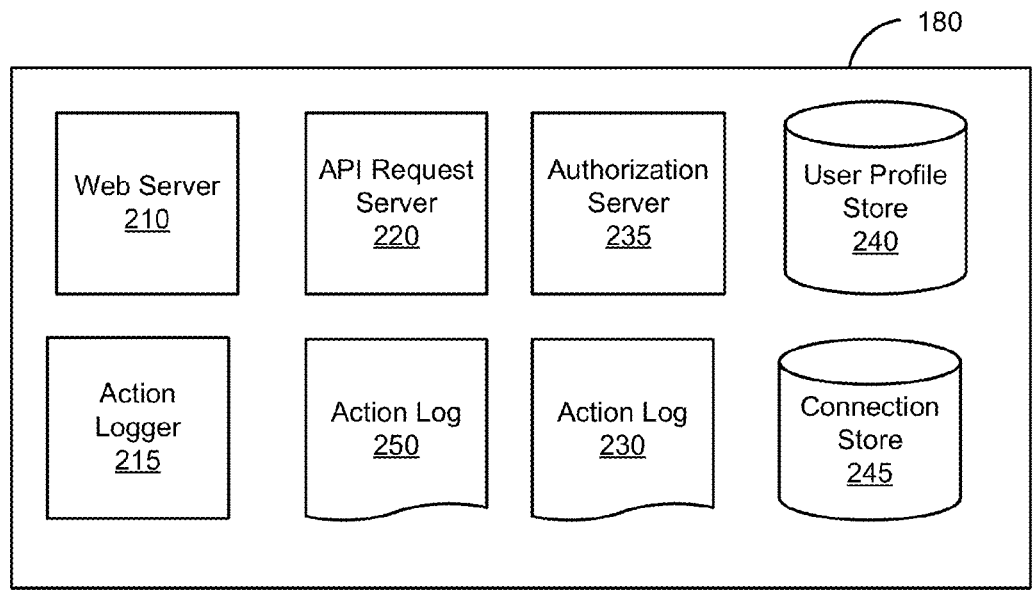
FIG. 2 is a block diagram of a social networking system, in accordance with an embodiment of the invention.

FIG. 2 is a diagram of one embodiment of a social networking system 180. The embodiment of a social networking website 180 shown by FIG. 2 includes a web server 210, an action logger 215, an API request server 220, an action log 230, a user profile store 240, and a connection store 245. In other embodiments, the social networking website 180 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 180 comprises a computing system that allows users to communicate or otherwise interact with each other and access content as described herein. The social networking system 180 stores user profiles describing the users of a social network. The user profiles include biographic, demographic, and other types of descriptive information, such as work experience, educational history, hobbies or preferences, location, and the like. The social networking system 180 further stores data describing one or more connections between different users in the connection store 245. The connection information may indicate users who have similar or common work experience, group memberships, hobbies, or educational history. Additionally, the social networking system 180 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

The web server 210 links the social networking system to one or more user device 110 and/or one or more external websites 180 via the network 240. The web server 210 serves web pages, as well as other web-related content, such as Java, Flash, XML, and so forth. The web server 210 may include a mail server or other messaging functionality for receiving and routing messages between the social networking system 180 and one or more user devices 110. The messages can be instant messages, queued messages (e.g., email), text and SMS messages, or any other suitable messaging format.

The Application Programming Interface (API) request server 220 allows one or more external websites 120 to access information from the social networking system 180 by calling one or more APIs. The API request server 220 may also allow external websites 120 to send information to social networking website by calling APIs. For example, an external website 120 sends an API request to the social networking system 180 via the network 140 and the API request server 220 receives the API request. The API request server 220 processes the request by calling an API associated with the API request to generate an appropriate response, which the API request server 220 communicates to the external website 120 via the network 140. For example, responsive to an API request, the API request server 220 collects data associated with a user and communicates the collected data to the external website 120.

The action logger 215 is capable of receiving communications from the web server 210 about user actions on and/or off the social networking system 180. The action logger 215 populates the action log 230 with information about user actions, allowing the social networking system 180 to track various actions taken by its users within the social networking system 180 and outside of the social networking system 180. Any action that a particular user takes with respect to another user is associated with each user's profile, through information maintained in the action log 230 or in a similar database or other data repository. Examples of actions taken by a user within the social network 180 that are identified and stored may include, for example, tagging a user in digital content such as an image, a video, an application or an article, adding a connection to another user, sending a message to another user, reading a message from another user, viewing content associated with another user, attending an event posted by another user or other actions interacting with another user.

Additionally, user actions may be associated with an entity outside of the social networking system 180, such as an external website 120 that is separate from the social networking system 180. For example, the action logger 215 receives data describing a user's interaction with an external website 120 from the web server 210. Examples of actions where a user interacts with an external website 120 include tagging a user in digital content represented by the website 120. Digital content includes images, videos, applications, games, articles, advertisements, etc.

The authorization server 235 enforces one or more privacy settings of the users of the social networking system 180. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites 120 or any entity that can potentially access the information. The information that can be shared by a user comprises user profile information like profile photo, phone numbers associated with the user, user's connections, actions taken by the user such as adding a connection, changing user profile information and the like.

Based on the user's privacy settings, the authorization server 235 determines if another user, an external website 120, an application or another entity is allowed to access information associated with the user, including information regarding whether a user is tagged in digital content inside or outside the social networking system. For example, the authorization server 235 uses a users privacy setting to determine if the user's tagging information should made available to one or more other users of the social networking system. This enables a user's privacy setting to specify which other users, or other entities, are allowed to receive data about the user's actions or other data associated with the user.

Additionally, the social networking system 180 maintains data about objects with which a user may interact with using the social networking system 180. To maintain this data, the user profile store 240 and the connection store 245 store instances of the corresponding type of objects maintained by the social networking system 180. Each object type has information fields that are suitable for storing information appropriate to the type of object. For example, the user profile store 240 contains data structures with fields suitable for describing a user's profile. When a new object of a particular type is created, the social networking system 180 initializes a new data structure of the corresponding type, assigns a unique object identifier to it, and begins to add data to the object as needed. This might occur, for example, when a user becomes a user of the social networking system 180, the social networking system 180 generates a new instance of a user profile in the user profile store 240, assigns a unique identifier to the user profile, and begins to populate the fields of the user profile with information provided by the user.

The connection store 245 includes data structures suitable for describing a user's connections to other users, connections to external websites 120 or connections to other entities. The connection stores 245 may also associate a connection type with a user's connections, which may be used in conjunction with the user's privacy setting, further described above, to regulate access to information about the user.

Data stored in the connection store 245, the user profile store 240 and the action log 230 allows the social networking system 120 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

For example, if a first user establishes a connection with a second user in the social networking system, user profiles of the first user and the second users from the user profile store 240 may act as nodes in the social graph. The connection between the first user and the second user stored by the connection store 245 is an edge between the nodes associated with the first user and the second user. Continuing this example, the second user man then send the first user a message within the social networking system 180, which is identified by the action logger 215 and stored in the action log 230. The stored action of sending the message is another edge between the two nodes in the social graph representing the first user and the second user. Additionally, the message itself may be identified from the action log 230 and included in the social graph as another node connected to the nodes representing the first user and the second user.

In another example, a first user may tag a second user in an image that is maintained by the social networking system 180 (or, alternatively, in an image maintained by another system outside of the social networking system 180). The image may itself be represented a node in the social networking system 180. This tagging action may create edges between the first user and the second user as well as create an edge between each of the users and the image, which is also a node in the social graph. In yet another example, if a user confirms attending an event, the user and the event are nodes obtained from the user profile store 240, where the attendance of the event is an edge between the nodes that may be retrieved from the action log 230. By generating and maintaining the social graph, the social networking system 180 includes data describing many different types of objects and the interactions and connections among those objects, providing a rich source of socially relevant information.

A photoset 250 is a photo album generated responsive to a user's search request. In one embodiment, the user may request to view photos wherein both the tagged user and the tagging user are tagged. In such an instance, the social networking system generates a photoset 250 responsive to the request. In one instance, the photoset 240 is generated by the social networking system in approximately real-time responsive to the user's request. In other instances, the photoset 240 may be generated from two users when a visiting user accesses or retrieves another user's social networking system page. Similarly, a photoset may be generated for any object within the social networking system wherein in one or more objects are tagged in a picture, an article, a video, etc.

Figure 3:
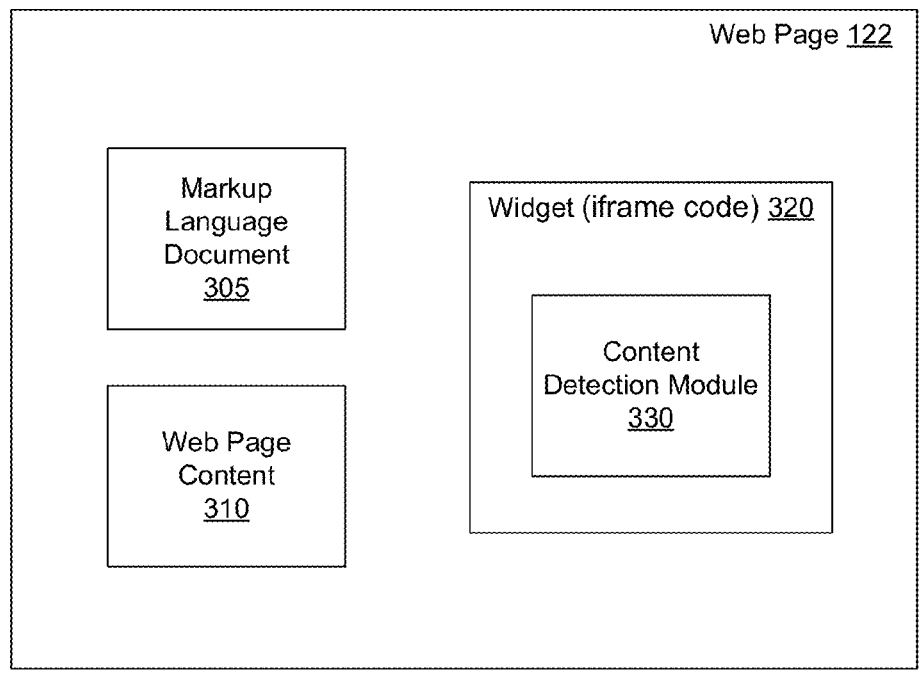
FIG. 3 is a block diagram of a third-party website enabled to allow a user to tag digital content in accordance with an embodiment of the invention.

FIG. 3 is one embodiment of a web page 122 of a third-party website 120. The web page includes a markup language document 305, web page content 310 and a widget (iframe code) 320. The widget 320 includes a content detection module 330.

In one embodiment, the web page 122 comprises a markup language document 305 that includes the content 310 and the instructions for formatting or presenting the content 310. In various embodiments, the markup language document 305 comprises a data file including extensible markup language (XML) data, extensible hypertext markup language (XHTML) data or other markup language data. In one instance, web page content 310 such as an image 140 may include tags. The tags may provide textual titles, labels and/or description about the content. For example, an image 140 may include an image tag, and a news article may include an article tag. In one instance, the social networking system 180 uses the tags to generate a node within the social networking system, wherein a node is an object that is connected to other objects in the social networking system via edges. The edges may describe the type of connection between two objects in the social networking system.

In one embodiment, a web page 122 includes a widget 320 comprising instructions that, when executed by an application 130 of a user device 100, retrieve data from the social networking system 180 and display the information retrieved from the social networking system 180. For example, the widget 320 comprises an instruction associated with the social networking system 180 that generates a frame within the web page 122 that includes information from the social networking system 180. Hence, the widget 320 allows a web page 122 from the third-party website 120 to provide personalized content from the social networking system 180 when the web page 122 is rendered and displayed by a application 130 of a user device 110. The widget 320 also allows a user to interact with content from the social networking website 130 by interacting with content in the frame generated within the web page 122.

The tagging frame 150 generated by the widget 320 calls a Uniform Resource Locator (URL) within a domain associated with the social networking system 130. The frame 150 is rendered by an application 130 operating on a user device 100 executing a widget 320 included in the markup language document 305 encoding the web page 122. The widget 320 comprising one or more instructions that, when executed by a application 130, generate the frame 320 the frame within the web page 122 and include information from the social networking system in the frame 150. In one embodiment, the frame 150 is an iframe including data obtained from the social networking system 130.

The frame 150 includes data from the social networking system 180 associated with a node maintained by the social networking system 130 and associated with a URL, or other web identifier, specified by the widget 320. For example, when a application 130 executes the widget 320, a request for content including a URL or other web identifier is communicated from the application 130 to the social networking system 130. The social networking system 130 identifies a node associated with the URL or other web identifier from the request for content and communicates information about the identified node to application 130, which displays the information in the frame 320. In one embodiment, the widget 320 communicates one or more parameters to the social networking system 180. The parameters allow the web page 320 to customize the frame 150. For example, the parameters specify the height and/or width of the frame 150.

In one embodiment, the frame 150 includes one or more action buttons and may also include social information from the social networking system 180, allowing a user to take a specific action with respect to the node associated with the content shown in the frame 150. The one or more action buttons allow a user to take a specific action with respect to the node associated with the content shown in the frame 150. The specific action may depend upon the type of node associated with the content in the frame 150. For example, if the node is an image, the action button may allow a user to tag users in the image. If the node is an article, the action button may allow a user to tag users who are mentioned in the article or have read the article. Thus a user can tag one or more users to the node or digital content provided by the web page 122.

The content detection module 340 detects web content displayed by the application 130 that is suitable for tagging a user or an object of the social networking system 180. Content suitable for tagging includes but is not limited to images, videos, articles, advertisements, applications and games. In one embodiment, the content detection module 340 identifies images displayed within a web page to identify images that a user may be interested in tagging. The content detection module, for example, can identify images larger than a certain size or displayed within text of a web page to identify important images and filter advertisements or thumbnails.

Figure 4:
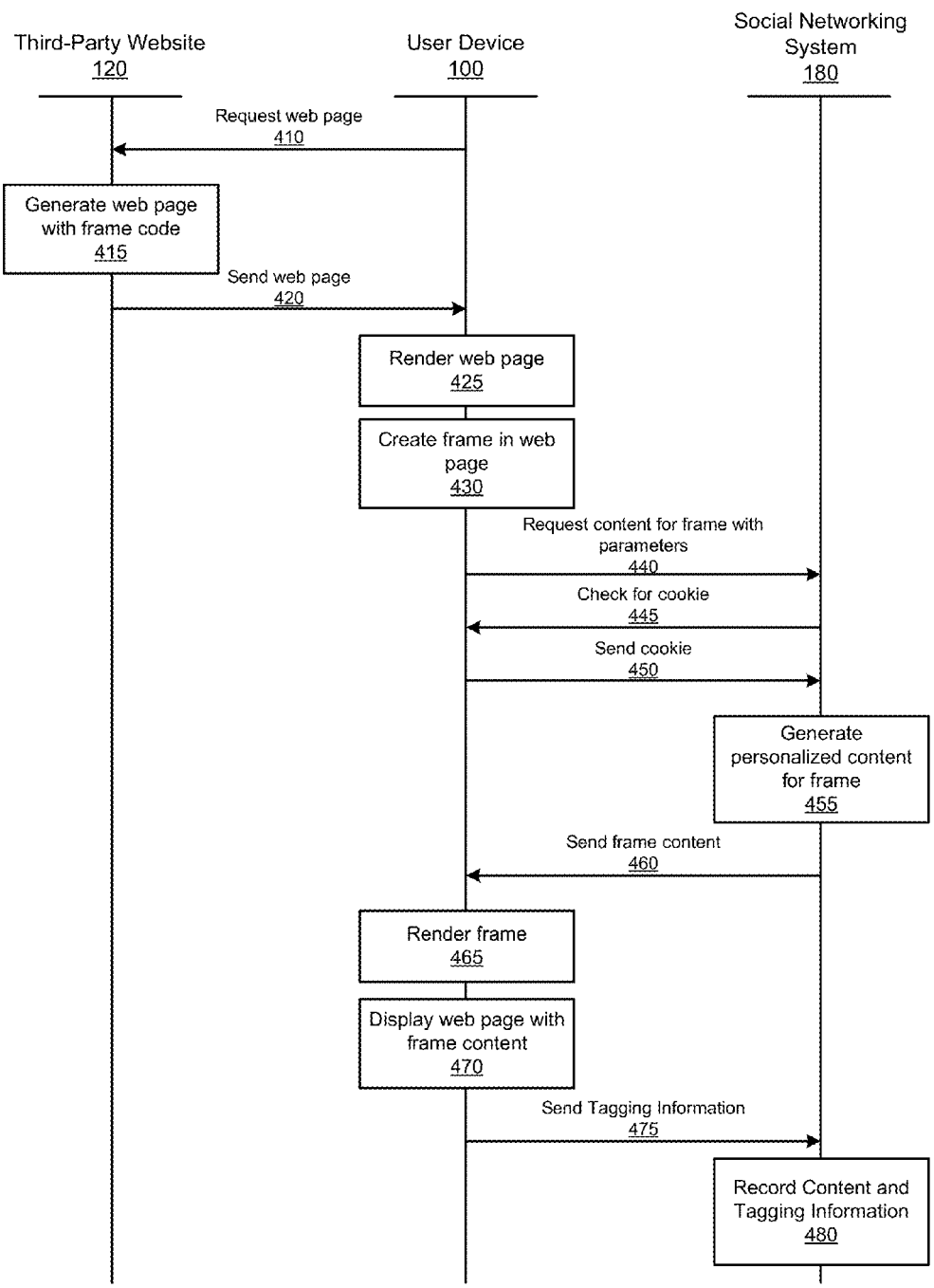
FIG. 4 is an interaction diagram of a process for interacting with a node outside of a social networking system, in accordance with an embodiment of the invention.

FIG. 4 is an interaction diagram of a process for tagging content outside of a social networking system 180, in accordance with an embodiment of the invention. In the embodiment shown by FIG. 4, the external website 120 is separate from the social networking system 180. Initially, a user device 100 requests 410 a web page 122 from the external website 120. For example, a user of the user device 100 enters a uniform resource locator (URL) or other identifier associated with the web page 122 into an application 130 operating on the user device 100. The application 130 identifies the external website 120 associated with the received URL or other identifier and requests 410 a web page 122 associated with the received URL or other identifier from the identified external website 120.

After receiving the request for the web page 122, the external website 120 generates the requested web page 122 using locally-stored data. For example, the external website 120 generates 415 a markup language document 305 describing the content and formatting of the web page 122 based on stored data. The external website 120 includes a widget 320 comprising instructions that, when executed by a application 130 of a user device 100, retrieve data from the social networking system 180 and display the information retrieved from the social networking system 180. For example, the widget 320 comprises an instruction associated with the social networking system 180 that generates a frame within the web page 122 that includes information from the social networking system 180. Hence, the widget 320 allows a web page 122 from the external website 120 to provide personalized content from the social networking website 180 when the web page 122 is rendered and displayed by a application 130 of a user device 100. The widget 320 also allows a user to interact with content from the social networking website 180 by interacting with content in the frame generated within the web page 122. The widget 320 includes a uniform resource locator (URL), or other web page identifier, associated with the web page 122 from the external website 120, and may also include one or more parameters describing presentation of the frame, or iframe, by the application 130 of the user device 100. In one embodiment, the URL included in the widget 320 is the same as the URL of the requested web page 122. Alternatively, the URL included in the widget 320 is a URL associated with a web page other than the requested web page 122.

The external website 120 then sends 420 the markup language document 305 describing the generated web page 122 and including the widget 320 to the user device 100 through the network 110. After receiving the markup language document 305, the application 130 renders 425 the web page 122 based on the content and formatting instructions included in the markup language document 305. In addition to rendering 425 the web page 122, the application 130 in the user device 100 executes the widget 320 to create 430 a frame in the web page 122. Execution of the widget 320 also causes the application 130 to request 440 content from the social networking system 180 for inclusion in the frame via the network 110. The URL, or other web identifier, included in the widget 320 is communicated to the social networking system 180 to request 440 content from a node associated with the URL included in the widget 320. In one embodiment, the application 130 also identifies one or more parameters from the widget 320 and transmits the identified parameters to the social networking system 180 when requesting 440 content for inclusion in the frame to allow further customization of the requested content.

Responsive to receiving the request for content from the application 130, the social networking system 180 checks 545 the user device 100 for a cookie 114. In response to the social networking system 180 checking 545 for the cookie 114, the user device 100 sends 450 the cookie 114, or a message associated with the cookie 114, to the social networking system 180. In one embodiment, the existence of cookie 114 indicates whether the user of the computing device 100 is a user of the social networking system 180 (e.g., whether the user has a valid account with the social networking system 180). If the user of the computing device 100 is a user of the social networking system 180, the cookie 114 may contain information indicating whether the user is logged into the social networking system 180 (e.g., whether the user has a current valid session with the social networking system 180). Checking 545 the user device 100 for a cookie 114 thus allows the social networking system 180 to authenticate the user session. In other embodiments, the social networking system 180 may just determine whether the user is a user of the social networking system 180, e.g., by checking 545 for an existence of a cookie, without determining whether the user is logged into the social networking system 180. Although cookies are described herein for authenticating the user and/or the user session, any other methods of user or session identification or authentication may be used (such as recognizing a physical token).

If the user associated with the received cookie 114 has been authenticated, the social networking system 180 generates 455 content for inclusion in the frame that is personalized according to the user associated with the received cookie 114. For example, the social networking system 180 generates 455 social information describing actions a node associated with the URL included in the widget 320 and associated with friends of the identified user. For example, the generated social information identifies a number of friends of the identified user taking a specific type of action regarding the node or identifies specific friends of a user recently taking a specified type of action regarding the node. Alternatively, the social networking system 180 generates 455 content by extracting data from the node associated with the URL included in the widget 320 without adding social information associated with the identified user. For example, the social networking system 180 determines a title, a description and an image from the node. Additionally, the social networking system 180 generates one or more action buttons for inclusion in the frame. The one or more action buttons are dependent on the node type, as described above in conjunction with FIGS. 3 and 4, and allow a user to interact with the node associated with the URL included in the widget 320 by interacting with the one or more action buttons.

If the social networking system 180 determines that the user associated with the received cookie 114 matches an administrator user identifier stored in the node associated with the URL included in the widget 320, the social networking system 180 generates 450 administration content for presentation by the frame. An administrator tag included in the markup language document 114 encoding a web page 122 specifies users of the social networking system 180 with the ability to create and/or maintain nodes associated with the web page 122. Hence, when the social networking system 180 identifies a user associated with an administrator user identifier, the social networking system 180 generates 455 content allowing the user to modify the node associated with the URL included in the widget 320. For example, the social networking system 180 generates 455 a link that directs the user to a debug page when accessed by the user via the frame. Alternatively, the social networking system 180 generates 455 debugging information from the node associated with the URL included in the widget 320 for display using the frame. For example the social networking system 180 identifies tags missing from the markup language document 305 encoding the web page 122 and allows the user to enter the missing tags or to modify existing tags.

However, if the social networking system 180 is unable to authenticate the user associated with the received cookie 114, the social networking system 180 communicates a prompt for the user to enter authentication information to the user device 100. Alternatively, the social networking system 180 generates 455 content by extracting data from the node associated with the URL included in the widget 320 without adding social information. In another embodiment, the social networking system 180 generates 455 content by extracting data from the node associated with the URL included in the widget 320 and determining actions taken by any user of the social networking system 180 regarding the identified node. For example, the social networking system 180 may identify the most recent actions regarding the identified node taken by any user of the social networking system 180. Thus, until the social networking system 180 receives authentication information associated with the user associated with the received cookie 114, the content generated 455 by the social networking system 180 does not include social information describing actions performed by friends of the user associated with the received cookie 114 regarding the identified node. After receiving and verifying authentication information associated with the user associated with the cookie 114, the social networking system 180 may generate 455 social information for inclusion in the frame that is personalized for the user associated with the cookie 305, as described above.

Similarly, if the user device 100 does not send 450 a cookie 114 to the social networking system 180, the social networking system 180 generates 455 content for inclusion in the frame by extracting information from the URL included in the widget 320. In one embodiment, the generated content may also include one or more actions taken by any user of the social networking system 180 and associated with the node associated with URL included in the widget 320. In one embodiment, the social networking system 180 also includes a prompt for joining the social networking system 180 in the frame.

The social networking system 180 then sends 460 the frame content to the user device 100 through the network 110. The application 130 included on the user device 100 then renders 465 using the frame using the content received from the social networking system 180 and displays 470 the web page 122 and the frame, with the content from the social networking system 180 displayed in the frame. The frame includes one or more action buttons generated by the social networking system 180. The action button may allow a user to tag users of the social networking system associated with or displayed on the web page.

When a social networking system user is tagged 475 by a user of the user device 100 interacting with an action button, the selected tagging information is transmitted 475 to the social networking system 180 via the network 110. Tagging 475 users in content provided by a web page outside of the social networking system domain allows the social networking system to provide additional content about tagged users to users of the social networking system. In one instance, it provides a user interface similar to the tagging user interface within the social networking system. Additionally, the external website 120 need not know that the action was taken, or even the identity of the user. The social networking system 180 then records 480 the tagging information provided by the user and the node associated with the digital content identified by the widget 320, allowing the social networking system 180 to tag users to content as if the content was uploaded to the social networking system 180.

In one embodiment, the action button or other user interact enabling the user to interact with the node may be on a portion of the web page that is within the third-party web page's domain, rather than within the frame. In such an embodiment, the third-party website 120 may need to communicate this action to the social networking system 180 so that the action can be recorded. In such an embodiment, the social networking system 180 may provide one or more APIs, which the third-party website 120 may use to send communications such as these to the social networking system 180. Alternatively, any other appropriate mechanisms for communicating this information from the third-party website 120 to the social networking system 180 may be used.

In addition to tagging 480 users in content, the social networking system 180 may take additional actions. For example, the social networking system 180 may publish the tagging information and the content to a feed associated with the tagging user and the tagged user. Similarly the users' profile may be updated to include the content and the tagging information.

Accordingly, the social graph maintained by the social networking system 180 may include anything that can be represented by a web page. In addition to increasing the amount of data stored by the social graph, this allows users of the social networking system 180 to easily tag and interact with nodes in the social graph while outside of a domain associated with the social networking system 180.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
providing, by a social networking system to a user device, a user interface comprising user interface elements for receiving tagging information associated with a content item hosted by a system external to the social networking system and the user device, the tagging information identifying one or more tagged users of the social networking system, and the tagging information identifying the content item at the system external to the social networking system;
receiving the tagging information from the user interface;
identifying a tagged user of the social networking system based on the tagging information; and
storing the tagging information in connection with the content item in the social networking system.

2. The method of claim 1, further comprising storing within the social networking system a copy of the content item at the system external to the social networking system.

3. The method of claim 1, further comprising storing within the social networking system a reference to the content item at the system external to the social networking system.

4. The method of claim 1, wherein the content item comprises one of an image, a video, an application, a game, or an article.

5. The method of claim 1, further comprising communicating the identification of the tagged users by one or more of publishing the identification in a feed story about one or more of the tagged users or displaying the identification in a display of the content item within the social networking system.

6. The method of claim 1, further comprising receiving an identity of a tagging user from the user device.

7. The method of claim 1, further comprising generating a privacy setting enabling a user to specify other users allowed to view the received tagging information within the social networking system.

8. The method of claim 1, wherein the user interface is implemented by iframe code provided by the social networking system.

9. A computer program product comprising a non-transitory computer-readable storage medium having instructions encoded thereon that, when executed by a processor, cause the processor to:

provide, by a social networking system to a user device, a user interface comprising user interface elements for receiving tagging information associated with a content item hosted by a system external to the social networking system and the user device, the tagging information identifying one or more tagged users of the social networking system, and the tagging information identifying the content item at the system external to the social networking system;
receive the tagging information from the user interface;
identifying a tagged user of the social networking system based on the tagging information; and
store the tagging information in connection with the content item in the social networking system.

10. The computer program product of claim 9, further comprising instructions that cause the processor to store within the social networking system a copy of the content item hosted by the system external to the social networking system.

11. The computer program product of claim 9, further comprising instructions that cause the processor to store within the social networking system a reference to the content item hosted by the system external to the social networking system.

12. The computer program product of claim 9, wherein the content item comprises one of an image, a video, an application, a game, or an article.

13. The computer program product of claim 9, further comprising instructions that cause the processor to communicate the identification of the tagged users by one or more of publishing the identification in a feed story about one or more of the tagged users or displaying the identification in a display of the content item within the social networking system.

14. The computer program product of claim 9, further comprising instructions that cause the processor to receive an identity of a tagging user from a computing device.

15. The computer program product of claim 9, further comprising instructions that cause the processor to generate a privacy setting enabling a user to specify other users allowed to view the received tagging information within the social networking system.

16. The computer program product of claim 9, wherein the tagging information is obtained by an application programming interface of the social-networking system in communication with the third-party system.

17. The computer program product of claim 9, wherein the system external to the social networking system is a website.

18. The computer program product of claim 9, wherein the tagging information associates a tagged user with an instance of the content item.

19. The computer program product of claim 9, wherein the user interface comprises elements for interacting with content items provided by the social networking system.

* * * * *